US008918598B2

(12) United States Patent
Aoki

(10) Patent No.: US 8,918,598 B2
(45) Date of Patent: Dec. 23, 2014

(54) SYNCHRONIZATION SYSTEM AND METHOD FOR STORAGES WITH DIFFERENT ACCESS SPEEDS

(75) Inventor: Keiichi Aoki, Kanagawa (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 419 days.

(21) Appl. No.: 13/390,242

(22) PCT Filed: Feb. 24, 2010

(86) PCT No.: PCT/JP2010/001244
§ 371 (c)(1),
(2), (4) Date: Apr. 17, 2012

(87) PCT Pub. No.: WO2011/024334
PCT Pub. Date: Mar. 3, 2011

(65) Prior Publication Data
US 2012/0198185 A1    Aug. 2, 2012

(30) Foreign Application Priority Data

Aug. 25, 2009    (JP) ................. 2009-194442

(51) Int. Cl.
G06F 12/00       (2006.01)
G06F 3/06        (2006.01)
A63F 13/30       (2014.01)
G07F 17/32       (2006.01)

(52) U.S. Cl.
CPC .............. *G06F 3/0607* (2013.01); *A63F 13/12* (2013.01); *G06F 3/0664* (2013.01); *G06F 3/0673* (2013.01); *G07F 17/3225* (2013.01); *G07F 17/3269* (2013.01); *A63F 2300/207* (2013.01); *A63F 2300/408* (2013.01)
USPC ........... 711/154; 711/167; 711/170; 711/112; 711/E12.001

(58) Field of Classification Search
CPC .... G06F 3/0611; G06F 3/0613; G06F 3/0607

USPC ........................... 711/167, 112, 170, E12.001
See application file for complete search history.

(56) References Cited

U.S. PATENT DOCUMENTS 6,502,165 B1 * 12/2002 Kishi et al. ................... 711/114
(Continued)

FOREIGN PATENT DOCUMENTS

| EP | 1746491 A1 | 1/2007 |
| JP | 2005321952 A | 11/2005 |
| JP | 2006254945 A | 9/2006 |

OTHER PUBLICATIONS

International Search Report for corresponding PCT Application No. PCT/JP2010/001244, dated May 25, 2010.

(Continued)

*Primary Examiner* — Pierre-Michel Bataille
(74) *Attorney, Agent, or Firm* — Matthew B. Dernier, Esq; Gibson & Dernier LLP

(57) ABSTRACT

A newer generation game terminal according to one embodiment of the present invention is provided with a storage access control unit. The storage access control unit accesses a newer generation storage according to a request for access from an application designed to execute a synchronization process based on the assumption of a speed of access to an older generation storage. The storage access control unit estimates time required to access the older generation storage in accordance with an evaluation function for calculating the required time. The storage access control unit executes an adjustment process to fill a time gap between the time required to access the newer generation storage and time estimated to be required to access the older generation storage.

9 Claims, 6 Drawing Sheets

(56) References Cited

U.S. PATENT DOCUMENTS

| | | | |
|---|---|---|---|
| 7,631,140 B2 | 12/2009 | Saito | |
| 7,676,658 B2 * | 3/2010 | Yanagawa et al. | 712/220 |
| 8,335,893 B2 * | 12/2012 | Tagawa | 711/154 |
| 8,560,799 B2 * | 10/2013 | Nasu et al. | 711/170 |
| 2007/0168321 A1 | 7/2007 | Saito | |
| 2008/0235467 A1 * | 9/2008 | Tagawa | 711/154 |

OTHER PUBLICATIONS

International Preliminary Report on Patentability and Written Opinion for corresponding PCT Application No. PCT/JP2010/001244, dated Mar. 13, 2012.

European search report for corresponding European Patent Application No. 10811394.5, dated Jul. 23, 2013.

* cited by examiner

FIG.3

| TERMINAL TYPE | STORAGE SPEED INDICATOR | ESTIMATION MODEL |
|---|---|---|
| 1 | 1 | OPTICAL DISK MODEL (1) |
| 2 | 2 | OPTICAL DISK MODEL (2) |
| 3 | 3 | CACHED OPTICAL DISK MODEL |
| 4 | 4 | MEMORY MODEL |
| 5 | 5 | CACHED MEMORY MODEL |

48

SYNCHRONIZATION SYSTEM AND METHOD FOR STORAGES WITH DIFFERENT ACCESS SPEEDS

TECHNICAL FIELD

The present invention relates to a data processing technology and, more particularly, to a technology of controlling access to a storage.

CROSS-REFERENCE TO RELATED APPLICATIONS

This application claims the benefit of PCT/JP10/01244 filed on Feb. 24, 2010 and Japan Patent No. 2009-194442 filed on Aug. 25, 2009.

BACKGROUND ART

Some applications like game applications (hereinafter, also referred to as "game AP") that require high-level real time processing assumes a speed of access to a storage as a precondition and post-access data processing is implemented based on the assumption. For example, data processing is often implemented such that the processing is synchronized with access to a storage.

Storage technology is progressing day by day and the speed of accessing data stored in a storage is also improving day by day. On the contrary, an application in which data processing is implemented on the assumption of a speed of access to a given storage may cause inconsistency in data processing when the application is executed in an information processing device provided with a storage with an access speed different from the speed of access to the storage for which the application is designed.

SUMMARY OF THE INVENTION

The present invention addresses the problem and a purpose thereof is to provide a technology of preventing inconsistency in data processing from occurring when an application designed to execute data processing on the assumption of a speed of access to a certain storage is executed in an information processing device provided with another storage with a different access speed.

The information processing device that addresses the problem is provided with a first storage with an access speed different from that of a second storage, and comprises: an access request acknowledging unit configured to acknowledge a request for access to a storage from an application designed to perform a synchronization process on the assumption that the speed of access to will be that of the access speed of the second storage; an access execution unit configured to perform a process of accessing the first storage in response to the request for access; an access time estimation unit configured to estimate the required time needed to perform a process of accessing the second storage in response to the request for access, in accordance with an evaluation function for calculating the required time; an adjustment unit configured to make an adjustment process to fill time gap between a record time required to perform a process of accessing the first storage and a required estimated time to perform a process of accessing the second storage; and an access completion notification unit configured to notify the application that the process of accessing the storage is completed after the adjustment process.

One embodiment of the present invention relates to an information processing method. The information processing method is adapted to execute, in an information processing device provided with a first storage with an access speed different from that of a second storage, an application designed to perform a synchronization process on the assumption that the speed of access will be that of the access speed of the second storage, the method comprising: acknowledging a request for access to a storage from the application; performing a process of accessing the first storage in response to the request for access; estimating the time required to perform a process of accessing the second storage in response to the request for access, in accordance with an evaluation function for calculating the required time; making an adjustment process to fill a time gap between the record time required to perform an access process for the first storage and a required estimated time to perform a process of accessing the second storage; and notifying the application that the process of accessing the storage is completed after the adjustment process.

Optional combinations of the aforementioned constituting elements, and implementations of the invention in the form of methods, apparatuses, systems, computer programs, data structures, and recording mediums may also be practiced as additional modes of the present invention.

According to present invention, inconsistency in data processing is prevented from occurring when an application designed to execute data processing on the assumption of a speed of access to a certain storage is executed in an information processing device provided with another storage with a different access speed.

Figure 1:
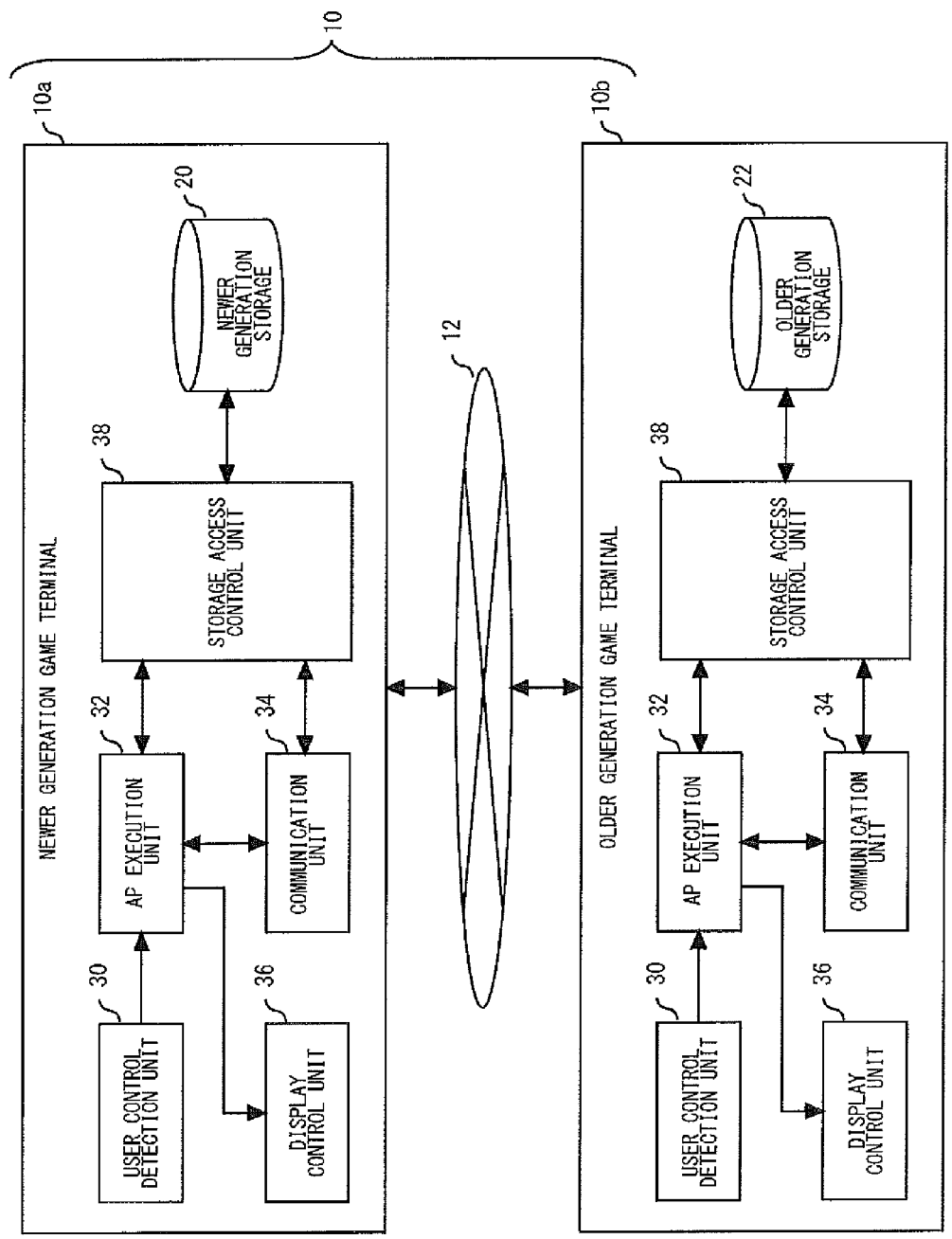
FIG. 1 shows the configuration of an online game system according to an embodiment.
Figure 4:
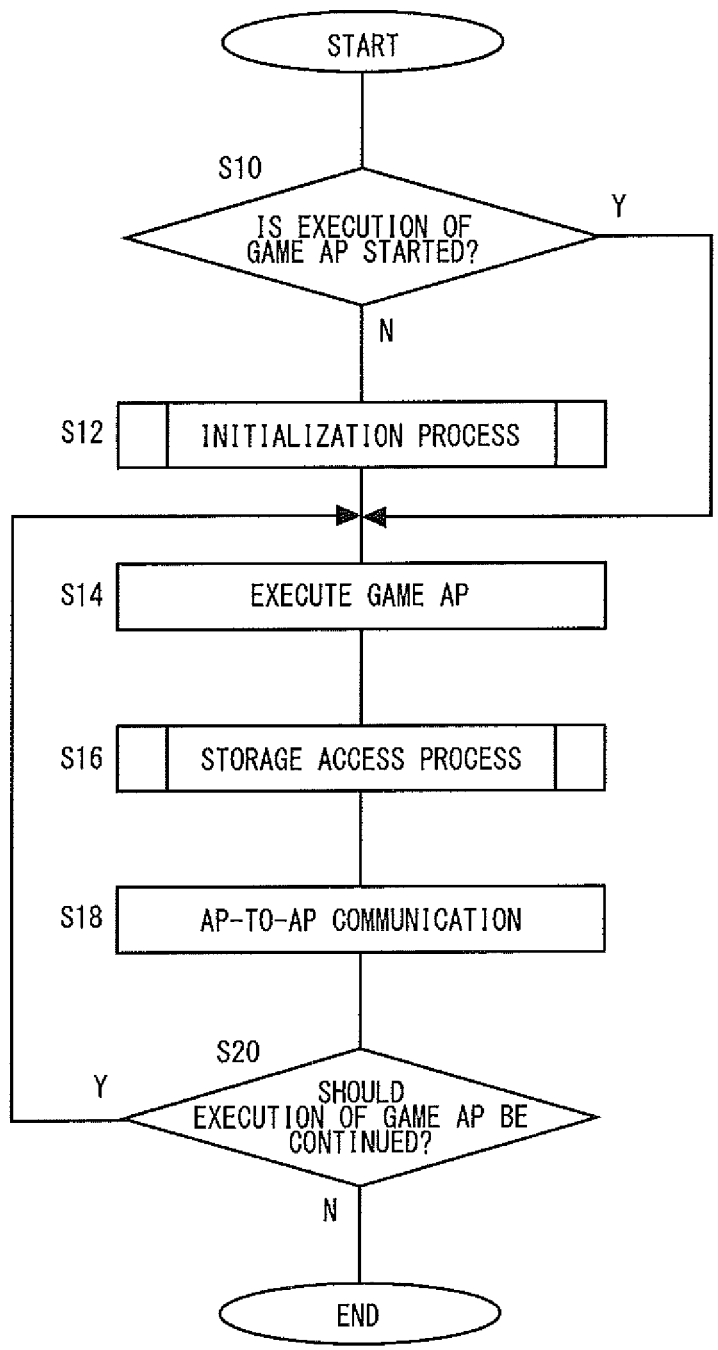
Figure 5:
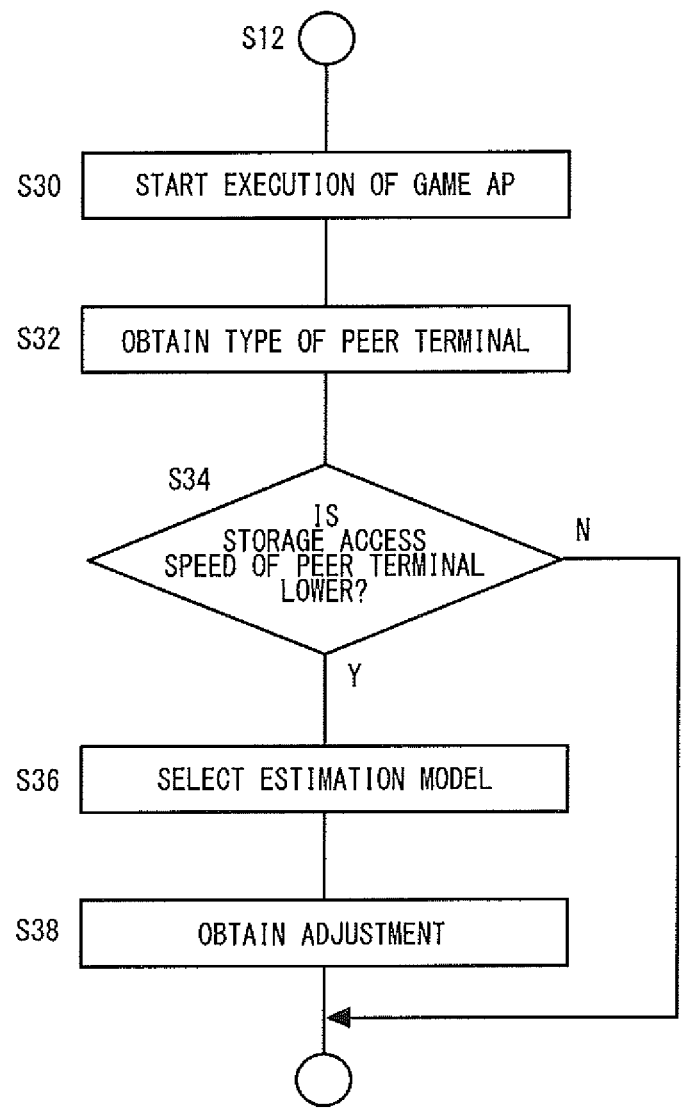
Figure 6:
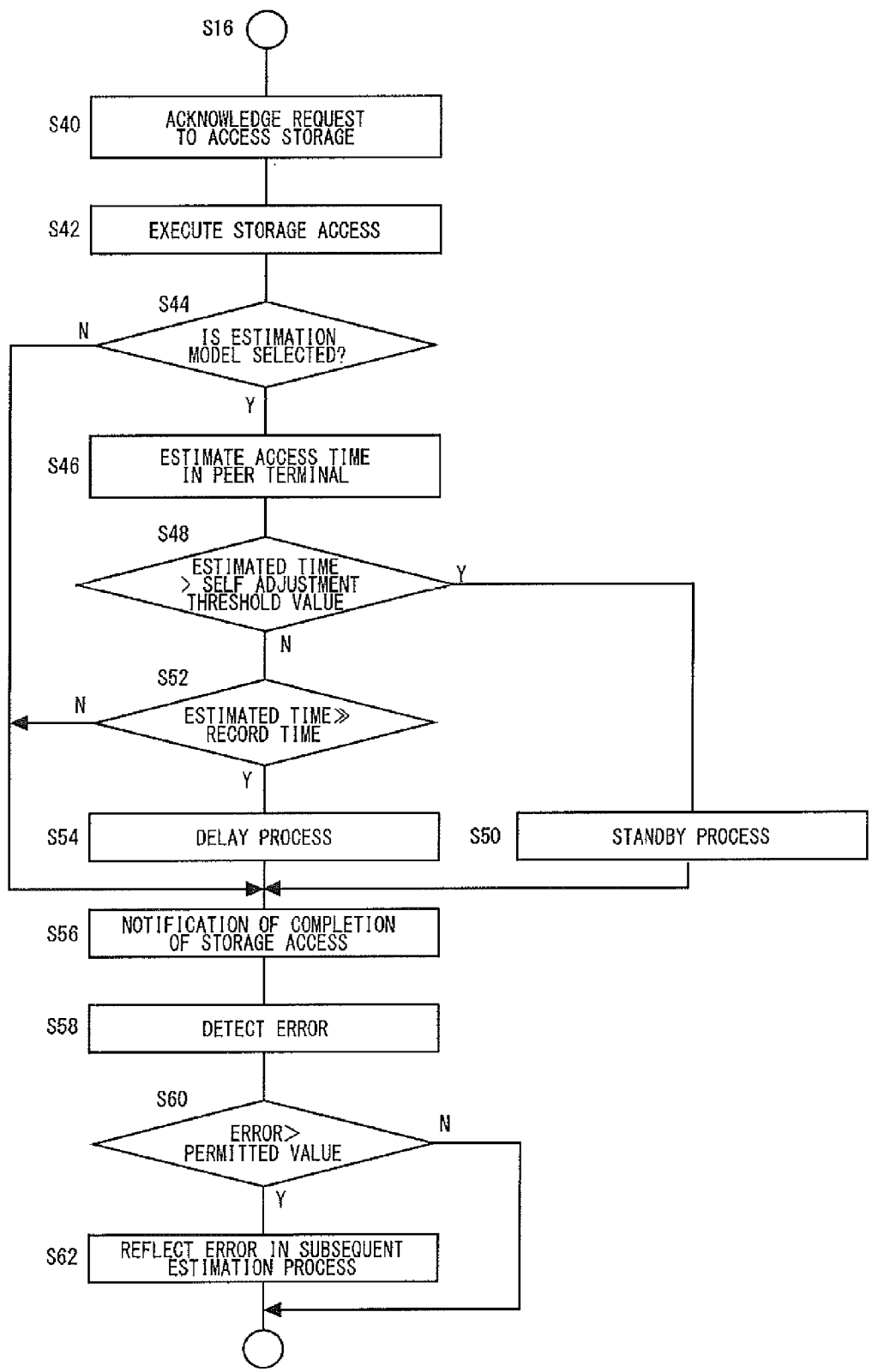

FIG. 3 schematically shows the configuration of an estimation model selection table;

FIG. 4 is a flowchart showing the operation of the game terminal of FIG. 1;

FIG. 5 is a flowchart showing the initial process in S12 of FIG. 4 in detail; and FIG. 6 is a flowchart showing the storage access process in S16 of FIG. 4 in detail.

DETAILED DESCRIPTION OF THE INVENTION

A summary of an embodiment of the present invention will be given before describing the configuration of the embodiment.

In an online game system run by connecting a plurality of game terminals via a network, the game progresses by processing data synchronously in the game terminals. For example, a storage may be accessed and then the data obtained from the storage may be exchanged between game terminals.

An online game system may include a newer generation game terminal provided with a storage capable of high-speed access and an older generation game terminal provided with a storage only capable of low-speed access. In this case, game terminals differ in the time required to access the storages so that a time gap is created between occurrences of communication after an access to the storage. This may cause an error in the operation of a game terminal. For example, a newer generation game terminal may access a storage and attempt to communicate with an older generation game terminal. However, storage access may not be completed in the older generation game terminal, creating a communication timeout.

To address this, we propose in this embodiment a game terminal configured to estimate the time required to access an older generation storage by using an emulation model compatible with the configuration of the older generation storage and to approximate the time required to access data in the newer generation storage to that of the older generation storage. This can maintain synchronization between game terminals and prevent inconsistency in data processing in the game terminals even if a plurality of game terminals provided with storages with different access speeds are co-located in the same online game system.

In other words, the embodiment addresses a problem caused by the fact that game applications ("game APs" hereinafter) are designed for a speed of access to a storage available at a certain point of time, while storages with higher speed are made available day to day. The game terminal according to the embodiment addresses the problem by an approach in which the speed of access to a storage is virtually limited.

FIG. 1 shows the configuration of an online game system according to the embodiment. An online game system 100 is provided with a newer generation game terminal 10a and an older generation game terminal 10b, which are generically referred to as game terminals 10. The newer generation game terminal 10a and the older generation game terminal 10b are connected to each other via a communication network 12 including a publicly known communication means (LAN/WAN/Internet, etc.).

The newer generation game terminal 10a is provided with a newer generation storage 20 with a higher access speed. Meanwhile, the older generation game terminal 10b is provided with an older generation storage 22 with a lower access speed. Hereinafter, the newer generation storage 20 and the older generation storage 22 may be generically referred to as "storages". The newer generation game terminal 10a and the older generation game terminal 10b synchronize themselves to cause an online game to progress. For example, the game terminals 10 access the storage and exchange data with each other via the communication network 12.

FIG. 1 shows the functionality of the game terminal 10 in the block diagrams. The blocks depicted in the block diagram of this specification are implemented in hardware such as devices or mechanical components like a CPU of a computer, and in software such as a computer program etc. FIG. 1 depicts functional blocks implemented by the cooperation of these elements. Therefore, it will be obvious to those skilled in the art that the functional blocks may be implemented in a variety of manners by hardware only, software only, or a combination of thereof. For example, the functional blocks of FIG. 1 may be installed in the hardware of the game terminal 10, read into a memory appropriately, and executed by a processor. Alternatively, the functional blocks may be implemented by an electronic circuit as hardware.

The newer game terminal 10a comprises a newer generation storage 20, a user control detection unit 30, an AP execution unit 32, a communication unit 34, a display control unit 36, and a storage access control unit 38. The older generation game terminal 10b is configured similarly as the newer generation game terminal 10a but comprises an older generation storage 22 in place of the newer generation storage 20.

The newer generation storage 20 and the older generation storage 22 are storage areas for storing parameters required to execute the game AP. Access to data stored in the newer generation storage 20 is executed at a higher speed than access to data stored in the older generation storage 22. A publicly known storage configuration may be applied to the newer generation storage 20 and the older generation storage 22. For example, the storages may be an optical disk such as DVD or Blu-ray Disc (BD), an optical disk provided with a cache device, or a semiconductor memory.

The user control detection unit 30 detects a user operation for controlling the game terminal 10 via an input device such as a control button (not shown). The AP execution unit 32 executes the game AP and causes an online game to progress. The communication unit 34 communicates via the communication network 12 with a terminal (hereinafter, also referred to as "a peer terminal") with which synchronization should be established for progress of the online game. The display control unit 36 displays the result of execution of the game AP in the AP execution unit 32, i.e., various content in the online game, on a display (not shown).

The storage access control unit 38 provides an interface for the AP execution unit 32 to access the storage. In other words, the storage access control unit 38 accesses the storage on behalf of the AP execution unit 32 and controls the access. More specifically, the AP execution unit 32 provides the storage access control unit 38 with a request to obtain data from the storage or a request to update data in the storage (hereinafter, simply referred to as "request for access"). The storage access control unit 38 refers to or updates data stored in the storage (hereinafter, simply referred to as "access process") in response to a request for access and sends the result of the process to the AP execution unit 32.

Figure 2:
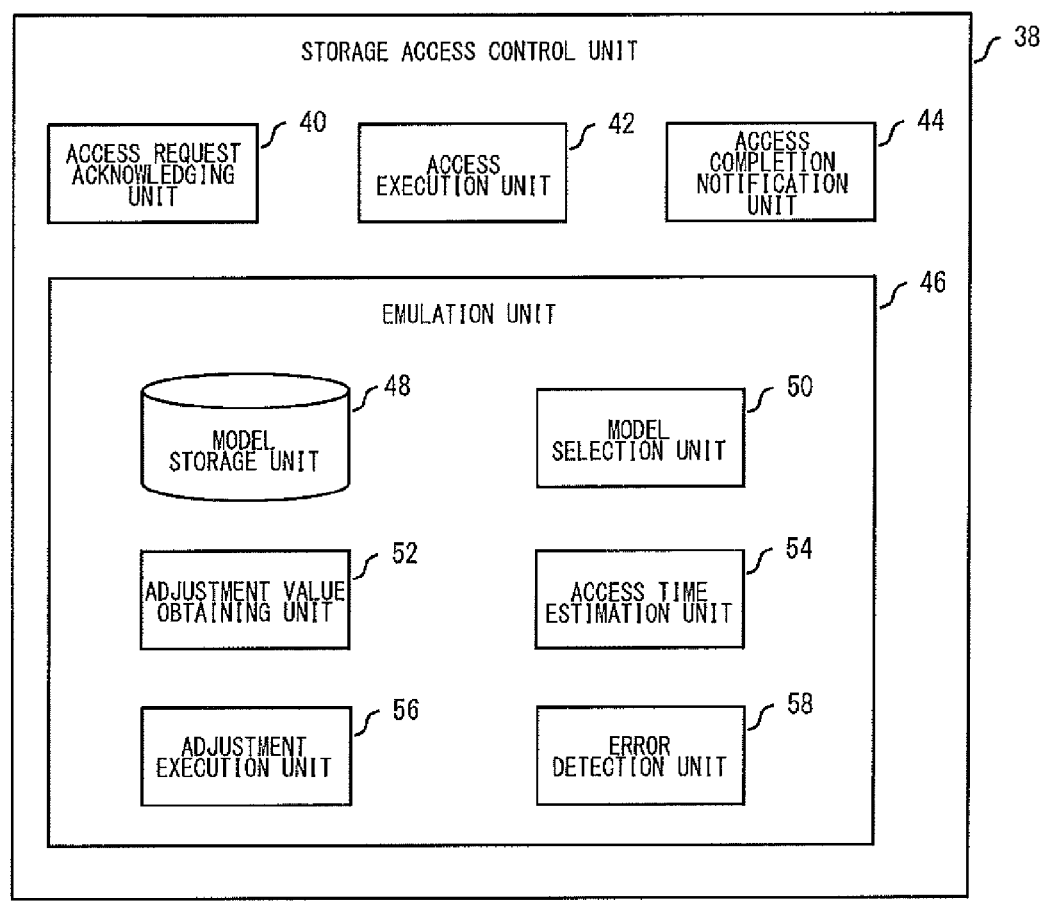
FIG. 2 shows the detailed configuration of the storage access control unit of FIG. 1.

FIG. 2 shows the detailed configuration of the storage access control unit 38 of FIG. 1. The storage access control unit 38 comprises an access request acknowledging unit 40, an access execution unit 42, an access completion notification unit 44, and an emulation unit 46. The access request acknowledging unit 40 acknowledges a request to access the storage from the AP execution unit 32. The access execution unit 42 accesses the storage in response to the request for access from the AP execution unit 32. The access completion notification unit 44 notifies the AP execution unit 32 that an access to the storage is completed.

The emulation unit 46 performs an emulation process to cancel the difference between the time required for storage access in the host game terminal and the time required for storage access in the peer terminal. The emulation unit comprises a model storage unit 48, a model selection unit 50, an adjustment value obtaining unit 52, an access time estimation unit 54, an adjustment execution unit 56, and an error detection unit 58.

The model storage unit 48 is a storage area for storing data for an evaluation function (hereinafter, also referred to as "estimation model") to calculate the time required for storage access in the peer terminal. The estimation model is a function defined according to the storage configuration. The model acknowledges the address of the data accessed in the storage, the data size, etc., and outputs the time required for storage access. An example of estimation model will be described later. The model storage unit 48 further stores an estimation model selection table from which to select an estimation model according to the type of the peer terminal.

FIG. 3 schematically shows the configuration of an estimation model selection table. The "terminal type" field contains identification information indicating the type of the game terminal 10 (e.g., terminal version). The "storage speed indicator" field contains a value indicating the storage access speed associated with the type of the game terminal 10. The figure shows that the higher the value, the higher the speed of access to the storage. The "estimation model" field contains identification information indicating an estimated model corresponding to the storage configuration identified by the type of the game terminal 10. Reference is made back to FIG. 2.

Before the execution of the game AP is started, the model selection unit 50 transmits to the peer terminal a request to obtain the terminal type of the peer terminal via the communication unit 34. The model selection unit 50 obtains from the peer terminal data indicating the terminal type of the peer terminal. The storage access control unit 38 of the peer terminal may acknowledge the request to obtain the terminal type and transmit data indicating the terminal type predefined for the host terminal to the source of request. The data indicating the terminal type may be predefined as additional information in the game AP executed in the peer terminal. For example, a game AP designed to be run on a specific type of terminal may have information identifying the terminal type recorded in the game AP. In this case, the storage access control unit 38 of the peer terminal may obtain the data from the game AP and transmit the obtained data to the source of request.

The model selection unit 50 refers to the estimation model selection table and compares the storage speed indicator of the terminal type of the peer terminal with that of the terminal type of the host terminal. If the storage speed indicator of the peer terminal is smaller than the storage speed indicator of the host terminal, i.e., if the storage access speed of the peer terminal is lower than the storage access speed of the host terminal, the estimation model selection unit 50 identifies an estimation model associated with the type of the peer terminal. The estimation model selection unit 50 obtains data for the identified estimation model and sends the data to the access time estimation unit 54.

In one variation, the estimation model selection table may list storage types instead of terminal types. The model selection unit 50 may obtain data indicating the storage type from the peer terminal and select an estimation model in accordance with the access speed identified by the storage type.

When the execution of the game AP is started, the adjustment value obtaining unit 52 detects whether an adjustment value for adjusting the estimated time determined by the estimation model is set in the game AP. If an adjustment value is set in the game AP, the adjustment value obtaining unit 52 obtains the adjustment value and sends the value to the access time estimation unit 54. The adjustment value is data for linearly increasing or decreasing the estimated time. For example, the adjustment value may be data indicating a ratio that should be multiplexed by the estimated time. In this case, the adjustment value may be set to 1 or greater if the estimated time determined by the estimation model should be increased. If the estimated time should be decreased, the adjustment value may be set to a value less than 1.

The access time estimation unit 54 estimates the storage access time of the peer terminal in accordance with the estimation model selected by the model selection unit 50, the adjustment value obtained by the adjustment value acquisition unit 52, and an error detected by the error detection unit 58. The time calculated in the estimation process will also be referred to as "estimated time". Typically, the primary estimated time is determined according to the estimation model, the secondary estimated time is determined by multiplying the primary estimated time by the adjustment value, and the ultimate estimated time is determined by adjusting the secondary estimated time according to the error. For example, given the past estimated time and an associated error, the error may be adjusted according to a ratio between the past estimated time and the current secondary estimated time so that the ultimate estimated time may be determined by increasing or decreasing the current secondary estimated time by the adjusted error.

The adjustment execution unit 56 obtains the (ultimate) estimated time determined by the access time estimation unit 54. The adjustment execution unit 56 further obtains the time required for storage access in the host terminal (hereinafter, also referred to as "record time") from the access execution unit 42. The adjustment execution unit 56 performs an adjustment process to fill the gap between the record time and the estimated time. More specifically, if the gap between the record time and the estimated time is equal to or more than a predefined adjustment execution threshold value (typically, if the estimated time is longer than the record time by the adjustment execution threshold value or more), the adjustment execution unit 56 performs a delay process as an adjustment process. For example, the adjustment execution unit 56 directs the access completion notification unit 44 to go to sleep for a duration defined by (estimated time−record time) and then notify the AP execution unit 32 that the access is completed.

The adjustment execution threshold value is set to a permitted difference between the record time and the estimated time. For example, the adjustment execution threshold value may be set to time equal to or less than communication time out between the AP execution units 32. Alternatively, the adjustment execution threshold value may be defined to be an appropriate value determined by the findings of a developer or experiments with using the online game system 100.

Further, if the estimated time determined by the access time estimation unit 54 is longer than a predetermined self-adjustment value, the adjustment execution unit 56 requests the peer terminal to provide explicit notification of completion via the communication unit 34 when the storage access is completed. In this case, the adjustment execution unit 56 performs an adjustment process by standing by until the unit 56 receives notification of completion from the peer terminal. After the adjustment execution unit 56 receives notification of completion, the unit 56 directs the access completion notification unit 44 to notify the AP execution unit 32 of the completion of access. In a variation, the adjustment execution unit 56 may stand by until the unit 56 receives from the AP execution unit 32 of the peer terminal communication data to establish synchronization after the storage access is completed, instead of requesting notification of completion from the peer device.

The self-adjustment threshold value is defined in accordance with tolerance for an error created as a result of adjustment based on the estimation in the host terminal. In other words, the longer the estimated time, the larger the difference between the estimated time and the actual time required in the peer terminal tends to be. Thus, a self-adjustment threshold value is defined in order to restrict autonomous adjustment based on the estimated time. Alternatively, the adjustment execution threshold value may be defined at an appropriate value according to the findings of a developer or experiments with using the online game system 100.

The error detection unit 58 obtains, via the communication unit 34, the actual time required for storage access in the peer terminal from the access execution unit 42 of the peer terminal. If the difference between the estimated time calculated in the host terminal and the actually required time is more than a predetermined permitted value, the error detection unit 58 communicates the error to the access time estimation unit 54, thereby causing the access time estimation unit 54 to calculate the estimated time that reflects the error in the subsequent estimated time calculation processes. Like the adjustment execution threshold value, the permitted value may also be set in accordance with the communication time out between the AP execution units 32.

Preferably, the error detection unit 58 detects an error while storage access is not performed in the host terminal or in the peer terminal. For example, the error detection unit 58 may detect an error after the access completion notification unit 44 communicates the completion of access and before the access request acknowledging unit 40 acknowledges the next request for access. This allows error detection to be performed asynchronously with storage access in the game terminal 10 and reduces the processing load of the storage access control unit 38 accordingly.

Hereinafter, optical disk model, cached optical disk model, and memory model will be described by way of examples of estimation models. It should be noted that "<a> model constant" is a value predefined for an estimation model according to the type of game terminal 10. "<b> model internal state" is temporary data stored in the access time estimation unit 54. The model internal state is updated according to storage access and referred to in the next storage access. "<c> parameters" are data necessary for storage access. The parameter values are determined at each occurrence of storage access. For example, the parameter values may be determined by the access execution unit 42.

1. Optical Disk Model
<a> Model Constant
  Time Tst required for the header to seek one track.
  Time Ttt required to access the data on the innermost track (track 1).
  Ratio Ftrackn (0<Ftrackn<1; the larger n, the smaller Ftrackn, because the speed of access to outer tracks is higher than that of inner tracks) of the time required to access the data on track n (n is a natural number equal to more than 1) with respect to the time required to access the innermost track.
<b> Model Internal State
  Current head position (track number) Phead.
<c> Parameter
  Start position of the destination of access (track number) Pread.
  Number of tracks accessed Lread.
<d> Flow of Estimating Access Time
Step 1: calculate seek amount Lseek by referring to the start position of the destination of access and the current head position.

$$Lseek=|Pread-Phead|.$$

Step 2: calculate seek time Tseek.

$$Tseek=Lseek \times Tst$$

Step 3. calculate the time required for data access by referring to the start position of the destination of access and the number of tracks accessed.

$$Tread = \sum_{n=Pread}^{Pread+Lread} (Ftrackn \times Ttt)$$

Step 4: calculate total access time T, which is an output from the estimation model.

$$T=Tseek+Tread$$

2. Cached optical disk model (items common to the optical disk model are omitted)
<a> Model Constant
  Cache access time Tcr required to retrieve data for one track.
  Penalty time Tcc incurred in the event of cache miss.

<b> Model Internal State
  Current cache status (information on cached tracks)
<c> Parameter
  Start position of the destination of access (track number) Pread.
  Number of tracks accessed Lread.
<d> Flow of Estimating Access Time
Step 1. determine whether the data on the accessed track is already cached by referring to the start position of the destination of access, the number of tracks accessed, and the cache status.
Step 2. calculate the access time Tcache required to access n cached tracks.

$$Tcache=Tcr \times n$$

Step 3. calculate disk access time Tdisc required to access m uncached tracks, as in the optical disk model.

$$Tdisc=Tseek+Tread+Tcc \times m$$

Step 4. calculate total access time T, which is an output from the estimation model.

$$T=Tcache+Tdisc$$

3. Memory Model:
<a> Model Constant
  Time Ttt required to access data for one block.
<b> Model Internal State
None
<c> Parameter
  Start address of the destination of access.
  Size of accessed data.
<d> Flow of Estimating Access Time
Step 1. calculate the number of blocks Lblk that should be accessed by referring to the start address of the destination of access and the size of accessed data. Data that do not fill a block are counted as one block.
Step 2. calculate total access time T, which is an output from the estimation model.

$$T=Ttt \times Lblk$$

The cached memory model of FIG. 3 is not fully described above, but, as already described in step 3 for the case of the cached optical disk model, the access time for m unchached tracks is calculated, as in the case of the memory model, and added to Tcache.

If the storage configuration of the host terminal is the same as the storage configuration of the peer terminal (e.g., if both terminals use a storage configuration including a cached optical disk), the internal state of the host terminal may be applied to the model internal state of the estimation model. More specifically, the current head position, cache status, etc. in the host terminal may be applied to the peer terminal unmodified.

Meanwhile, if the storage configuration of the host terminal is different from the storage configuration of the peer terminal, the access time estimation unit 54 of the host terminal may continually trace the internal state of the peer terminal (e.g., the head position or the cache status) according to the internal state updating algorithm in the peer terminal. For example, the data indicating the cache status of the peer terminal may be continually updated according to the cache algorithm (e.g., FIFO or LRU) in the peer terminal each time storage access occurs in the host terminal.

A description will be given of the operation in the above configuration. FIG. 4 is a flowchart showing the operation of the game terminal 10 of FIG. 1. If the execution of the game AP is not started in the AP execution unit 32 (N in S10), the initial process described later is executed (S12). If the execution of the game AP is already started (Y in S10), S12 is skipped. The AP execution unit 32 executes the game AP so as to cause the online game to progress (S14). The AP execution unit 32 sends a request to access the storage to the storage access control unit 38. The storage access control unit 38 executes a storage access process described later (S16). Thereafter, the AP execution unit 32 initiates communication with the AP execution unit 32 of the peer terminal to be synchronized with the peer terminals (S18). If the execution of the game AP should be continued (Y in S20), control is returned to S14. If the execution of the game AP should be terminated (N in S20), the process of the flow is terminated.

FIG. 5 is a flowchart showing the initial process in S12 of FIG. 4 in detail. The AP execution unit 32 starts executing the game AP (S30). The model selection unit 50 obtains the type of the peer terminal from the peer terminal (S32). If the storage access speed in the peer terminal is lower than the storage access speed in the host terminal (Y in S34), the model selection unit 50 selects an estimation model determined by the type of the peer terminal and communicates the model to the access time estimation unit 54 (S36). The adjustment value obtaining unit 52 obtains the adjustment value predefined for the game AP and communicates the value to the access time estimation unit 54 (S38). If the storage access speed of the peer terminal is equal to or higher than the storage access time of the host terminal (N in S34), S36 and S38 are skipped. For example, the new generation game terminal 10a selects an estimation model associated with the older generation storage 22 of the older generation game terminal 10b. Meanwhile, the older generation game terminal 10b skips the process of selecting an estimation model.

FIG. 6 is a flowchart showing the storage access process in S16 of FIG. 4 in detail. The access request acknowledging unit 40 acknowledges a request to access the storage from the AP execution unit 32 (S40). The access execution unit 42 accesses the storage in the host terminal (S42).

If an estimation model is already selected (Y in s44), the access time estimation unit 54 estimates the storage access time in the peer terminal according to the estimation model, the adjustment value predefined for the game AP, and the error associated with the past estimated time (S46). If the estimated time is longer than the self-adjustment threshold value (Y in S48), the adjustment execution unit 56 stands by until the completion of storage access in the peer terminal is detected (S50). If the estimated time is equal to or shorter than the self-adjustment threshold value (N in S48), and if the time gap between the estimated time and the record time is equal to or more than the adjustment execution threshold value (Y in S52), the adjustment execution unit 56 delays the subsequent steps by the time gap (S54). If the time gap between the estimated time and the record time is less than the adjustment execution threshold value (N in S52), S54 is skipped. If an estimation model is not selected (N in S44), S46-S54 are skipped. For example, S46-S54 are executed in the newer generation game terminal 10a and are skipped in the older generation game terminal 10b.

The access completion notification unit 44 notifies the AP execution unit 32 that the access to the storage is completed (S56). The error detection unit 58 obtains the time required for actual storage access from the peer terminal. The error detection unit 58 detects an error between the actual required time and the estimated time (S58). If the error is greater than the permitted value (Y in S60), the error detection unit 58 reflects the error in the subsequent step of calculating the estimated time by communicating the error to the access time estimation unit 54 (S62). If the error is equal or less than the permitted value (N in 60), S62 is skipped. The flowcharts of this specification show steps as being performed in series. Alternatively, the steps may of course be performed in parallel. For example, the total processing time will be reduced by performing the storage access process of S42 and the access time estimation process of S46 in parallel.

According to the game terminal 10 of the present embodiment, synchronization between game terminals can be maintained even if a game terminal provided with a high-speed storage and a game terminal provided with a low-speed storage are co-located in the same online game system. For example, occurrence of time out in the communication process for maintaining synchronization between game terminals is prevented. This eliminates the need to provide a limit to the storage access speed in an online game system. It is therefore possible to provide an online game in which a variety of game terminals can participate.

In further accordance with the game terminal 10, the estimated time output from the estimation model is adjusted by the adjustment value defined for the game AP. Adjustment by an adjustment value allows calculating the estimated time in adaptation for the characteristic of the game AP even if the estimation model is not perfect, i.e., even if it is difficult to calculate the estimated time adapted to the characteristic of individual game AP's by using the estimation model.

In further accordance with the game terminal 10, the actual time required for storage access in the peer terminal is compared with the time estimated for the host terminal so as to detect an error. The detected error is fed back to the calculation of the estimated time. This improves precision of estimation in the host terminal.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described above, the game terminal 10 is connected to a peer device and synchronizes itself with the peer device. The presence of a peer device is not essential in the technical idea of the present invention. The technical idea of the present invention can be applied in general to cases where an application designed to execute a synchronization process on the assumption of a speed of access to a first storage is run in an information processing device provided with a second storage with an access speed different from that of the first storage. In other words, the technical idea can be applied to standalone information processing devices. This prevents an error from occurring wile applications are being synchronized (e.g., when synchronization is established between an access to a storage, a separate process performed during the access, and a process of the joining processes). In this case, the model selection unit 50 obtains, from the application being executed, information indicating the type of storage for which the application is designed so as to select an estimation model adapted for the storage type.

In the embodiment described above, the online game system 100 includes two game terminals 10 that should be synchronized. However, the number of game terminals 10 is non-limiting and the online game system 100 may of course include three or more game terminals 10. In this case, the game terminal with the smallest storage speed indicator, i.e., the game terminal 10 with the lowest speed of access to the storage, represents the older generation game terminal 10b according to the embodiment. The estimation model adapted for that terminal is selected in the other game terminals 10.

According to the embodiment, the process of estimating the storage access time of the peer terminal is skipped in the game terminal 10 with a lower speed of access to the storage. In one variation, the process of estimating the storage access time in the peer terminal may be performed in all game terminals regardless of the terminal type or storage type. The estimated time and the record time of the host terminal may be compared so that adjustment is performed in adaption for the lowest access speed. According to this variation, synchronization between game terminals 10 can be maintained even if the relative speed of access to the storage cannot be uniquely determined merely by referring to the terminal type or storage type. For example, comparing a storage configuration in which an optical disk is used with a configuration in which a cached optical disk is used, the latter will provide higher speed in a majority of cases. In the event of frequent cache misses, however, the former could be higher due to the penalty incurred in the event of cache misses. The above-described variation ensures that synchronization is performed properly even in a case like the above.

In the described as described, the adjustment execution unit 56 stands by until the unit 56 receives explicit notification of completion from the peer terminal, if the estimated time is greater than the self-adjustment threshold value. The function for the standby process is not essential in the adjustment execution unit 56. In one variation, the adjustment execution 56 may be configured not to perform the standby process. In this case, the steps of S48 and S50 in the flowchart of FIG. 6 are not executed.

An arbitrary combination of the embodiment and variations will also be useful as the embodiment of the present invention. The new embodiment produced by the combination will provide combined advantages of the embodiment and the variation included in the combination.

A skilled person would naturally understand that the functions that should be achieved by the constituting elements recited in the claims will be implemented by the constituting elements shown in the embodiment and the variations either alone or in combination. For example, the access time estimation unit recited in the claims may be implemented by the combination of the model selection unit 50, the adjustment value obtaining unit 52, and the access time estimation unit 54 described in the embodiment.

DESCRIPTION OF THE REFERENCE NUMERALS 10 game terminal, 20 newer generation storage, 22 older generation storage, 30 user control detection unit, 32 AP execution unit, 34 communication unit, 36 display control unit, 38 storage access control unit, 40 access request acknowledging unit, 42 access execution unit, 44 access completion notification unit, 46 emulation unit, 48 model storage unit, 50 model selection unit, 52 adjustment value obtaining unit, 54 access time estimation unit, 56 adjustment execution unit, 58 error detection unit, 100 online game system The present invention can be applied to an information processing device configured to run an application that requests access to a storage.

The invention claimed is:

1. An information processing device provided with a first storage with an access speed different from that of a second storage, comprising:
    an access request acknowledging unit configured to acknowledge a request for access to a storage from an application designed to perform a synchronization process on the assumption that the speed of access will be the access speed of the second storage;
    an access execution unit configured to perform a process of accessing the first storage in response to a request for access;
    an access time estimation unit configured to estimate the required time needed to access the second storage in response to a request for access, in accordance with an evaluation function for calculating the required time;
    an adjustment unit configured to make an adjustment process to fill a time gap between the time required to access the first storage and an estimated time to access the second storage; and
    an access completion notification unit configured to notify the application that the process of accessing the storage is completed after the adjustment process,
    wherein, if the first storage access time is shorter than the estimated second storage access time by a predetermined duration or longer, the adjustment unit delays the notification of completion for a duration indicated by the time gap.

2. The information processing device according to claim 1, wherein the access time estimation unit selects an evaluation function associated with the configuration of the second storage from a plurality of types of evaluation functions associated with a plurality of storage configurations, respectively, so as to estimate the required time.

3. The information processing device according to claim 1, wherein the application includes an adjustment value for adjusting the required estimated time to perform a process of accessing the second storage, and
    wherein the access time estimation unit adjusts the required estimated time calculated according to the evaluation function, in accordance with the adjustment value.

4. The information processing device according to claim 1, wherein
    the information processing device is connected to another information processing device provided with the second storage,
    the access request acknowledging unit acknowledges the request for access from an application that should execute a series of data processing steps in synchronization with another application installed in the other information processing device, and
    the adjustment unit performs the adjustment process for synchronization between the application and the other application.

5. The information processing device according to claim 4, further comprising:
    an error detection unit configured to obtain the record time required to perform an access process for the second storage from the other information processing device and to detect an error in the estimated time calculated by the access time estimation unit for the access process,
    wherein the access time estimation unit adjusts, upon detection of an error equal to or greater than a predetermined value, the estimated time calculated according to the evaluation function, in accordance with the error.

6. The information processing device according to claim 5, wherein the error detection unit detects the error when the access process for the first storage is not performed.

7. The information processing device according to claim 4, wherein, if the required estimated time is equal to or longer than a predetermined duration, the adjusting unit performs the adjustment process by suspending notification of the completion of an access until the completion of an access to the second storage in the other information device is detected.

8. An information processing method adapted to execute, in an information processing device provided with a first storage with an access speed different from that of a second storage, an application designed to perform a synchronization process on the assumption that the speed of access will be that of the access speed of the second storage, the method comprising:
- acknowledging a request for access to a storage from the application;
- performing a process of accessing the first storage in response to the request for access;
- estimating the time required to access the second storage in response to the request for access, in accordance with an evaluation function for calculating the required time;
- making an adjustment process to fill a time gap between the time required to access the first storage and a required estimated time to access the second storage; and
- notifying the application that the process of accessing the storage is completed after the adjustment process,
- wherein, if the first storage access time is shorter than the estimated second storage access time by a predetermined duration or longer, the adjustment process delays the notification of completion for a duration indicated by the time gap.

9. A recording medium having embodied thereon a computer program adapted for execution, in an information processing device provided with a first storage with an access speed different from that of a second storage, of an application designed to perform a synchronization process on the assumption of a speed of access to the second storage, the program comprising:
- a module configured to acknowledge a request for access to a storage from the application;
- a module configured to access the first storage in response to the request for access;
- a module configured to estimate time required to access the second storage in response to the request for access, in accordance with an evaluation function for calculating a required time;
- a module configured to make an adjustment process to fill a time gap between a time required to access the first storage and a required estimated time to access the second storage; and
- a module configured to notify the application that the process of accessing the storage is completed after the adjustment process,
- wherein, if the first storage access time is shorter than the estimated second storage access time by a predetermined duration or longer, the module for the adjustment process delays the notification of completion for a duration indicated by the time gap.

* * * * *